United States Patent
MacAusland et al.

[19]

[11] Patent Number: 6,155,297

[45] Date of Patent: Dec. 5, 2000

[54] SPOUT CONTROLLED MIXING VALVE MECHANISM

[76] Inventors: Samuel S. MacAusland, 58A Colburn Rd., Wellesley, Mass. 02181; Behzad Malekan, 360 Weston St., Waltham, Mass. 02154

[21] Appl. No.: 09/506,212

[22] Filed: Feb. 17, 2000

Related U.S. Application Data

[63] Continuation-in-part of application No. 08/926,538, Sep. 10, 1997, Pat. No. 6,070,612, which is a continuation-in-part of application No. 09/086,378, May 28, 1998, abandoned.

[51] Int. Cl.⁷ .................................................. F16K 11/076
[52] U.S. Cl. ..................... 137/625.41; 137/616.3
[58] Field of Search ............................ 137/616.3, 616.7, 137/625.41

[56] References Cited

U.S. PATENT DOCUMENTS 5,469,889  11/1995  Tang ................................. 137/925.41
5,685,339  11/1997  Lee ................................... 137/625.41

*Primary Examiner*—John Fox
*Attorney, Agent, or Firm*—Lambert & Assoc., PLLC; Gary E. Lambert; Donald J. MacDonald

[57] ABSTRACT

An improved ball valve mechanism requiring no handle for the direction and intermixing of two or more liquids. Control of liquid volume, admixing and directional output is accomplished by manipulating the spout itself which acts both as the liquid outlet and the controller. A swivel spray aerator fixture can be used to redirect the flow to any location in the sink. The configuration of the ball valve mechanism is hollow and has a hollow stem through which the admixed liquid is directed into the spout. Pins are provided in the ball valve body which engage slots in the ball valve mechanism enabling more precise control over rotation of the ball valve mechanism.

21 Claims, 15 Drawing Sheets

SECTION 3-3

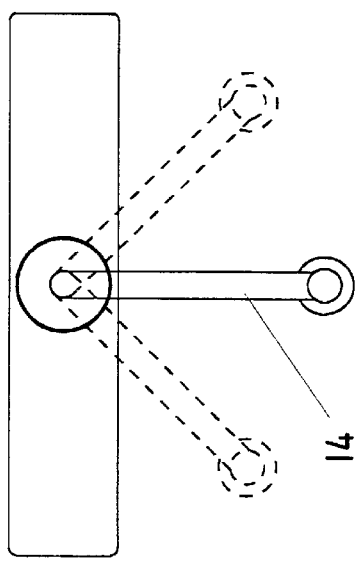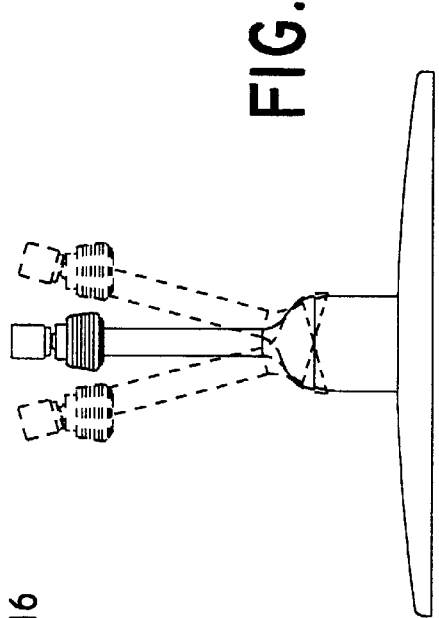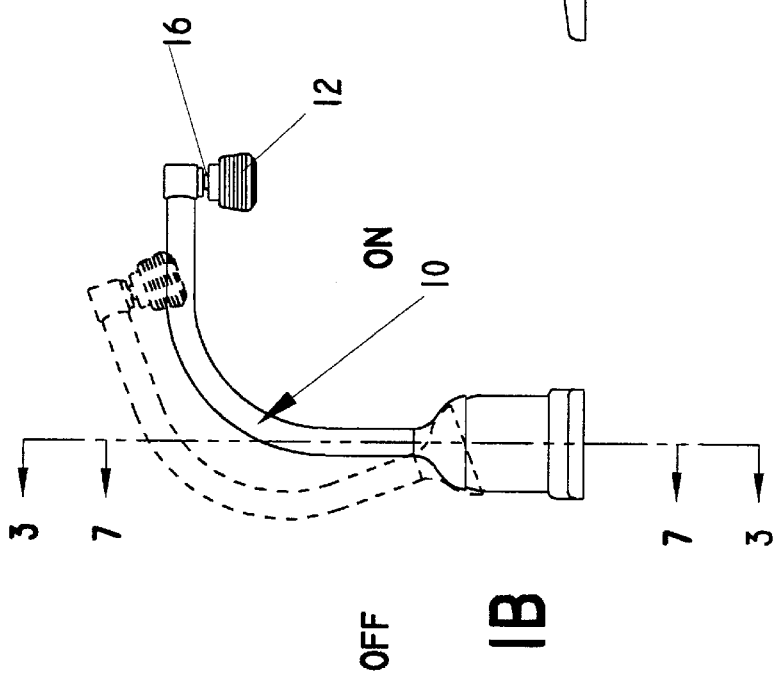

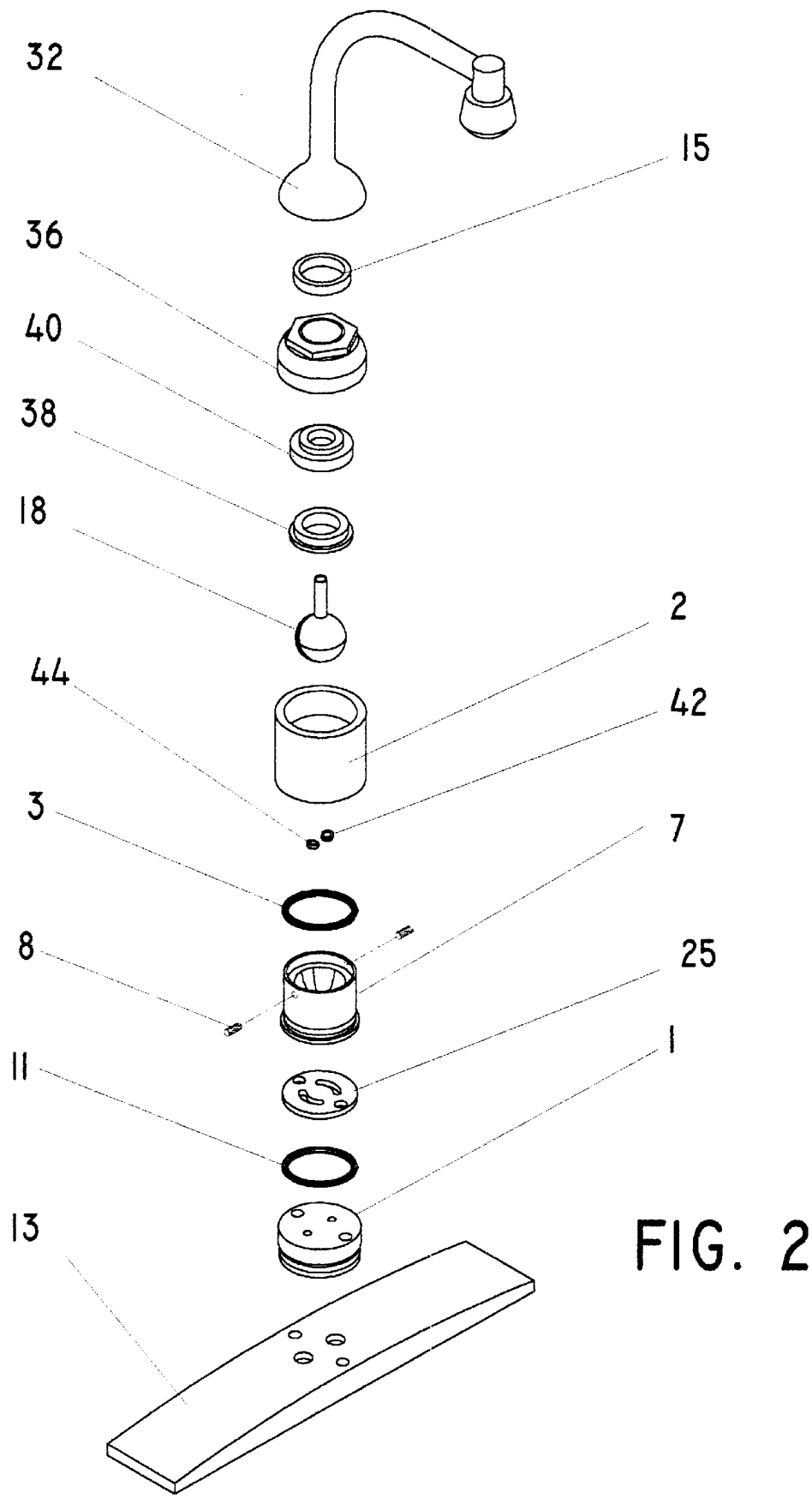

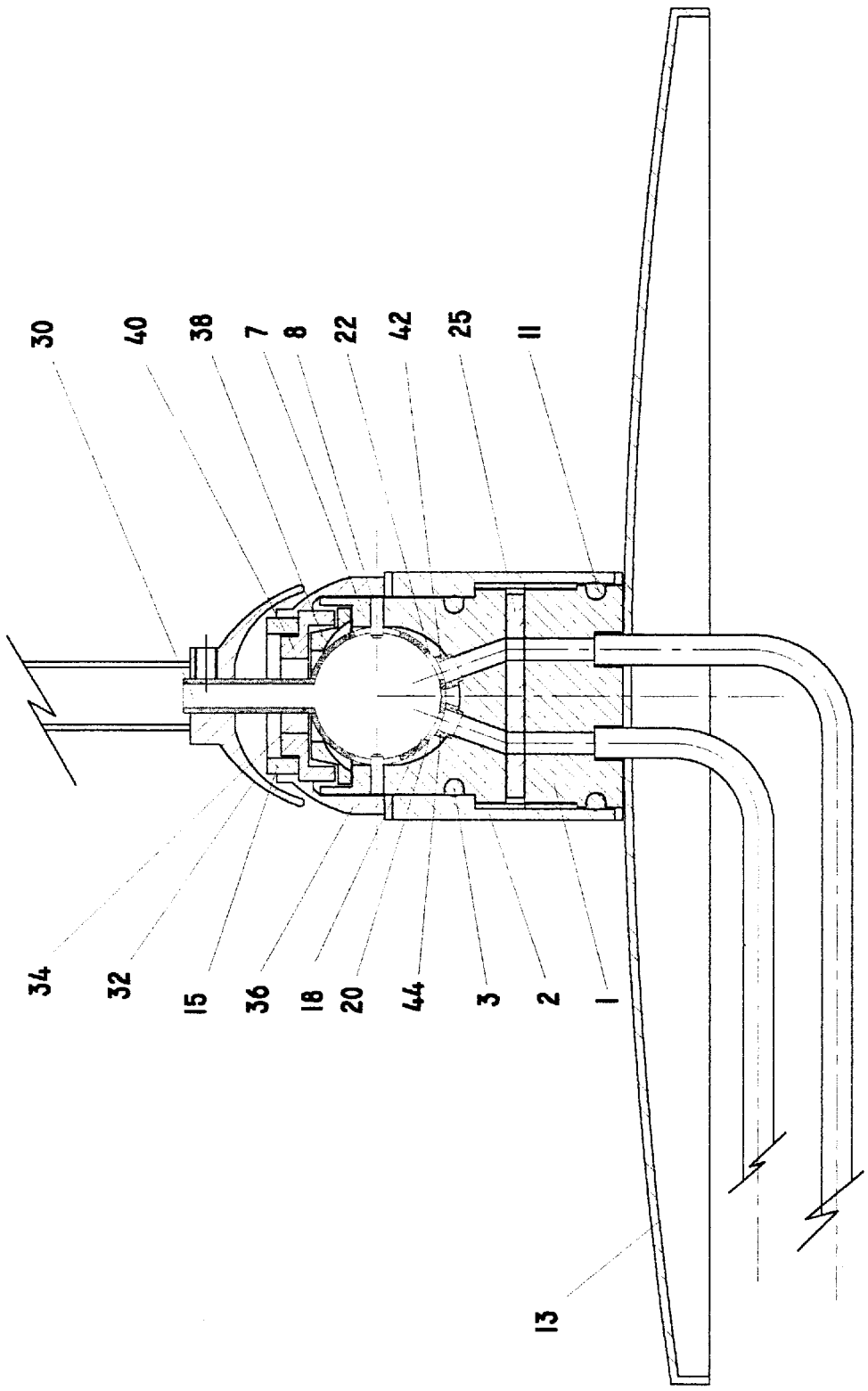

SECTION 8-8

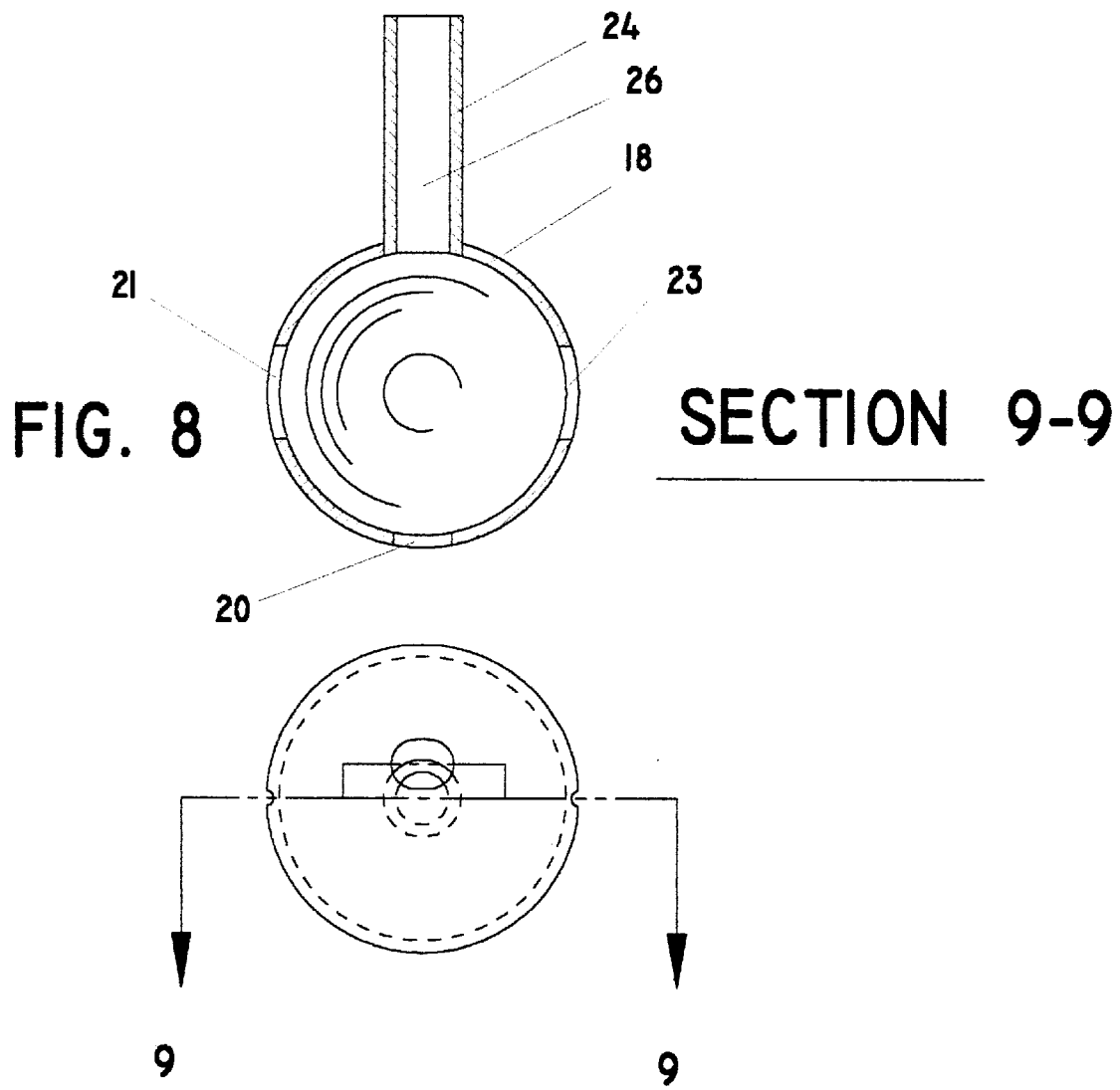
FIG. 8    SECTION 9-9
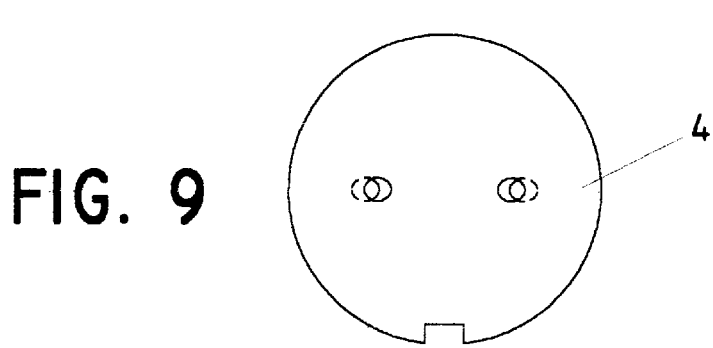
FIG. 9

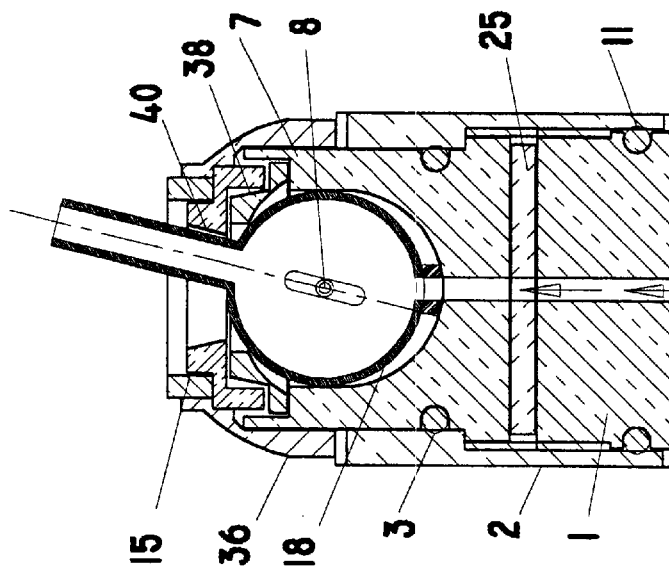
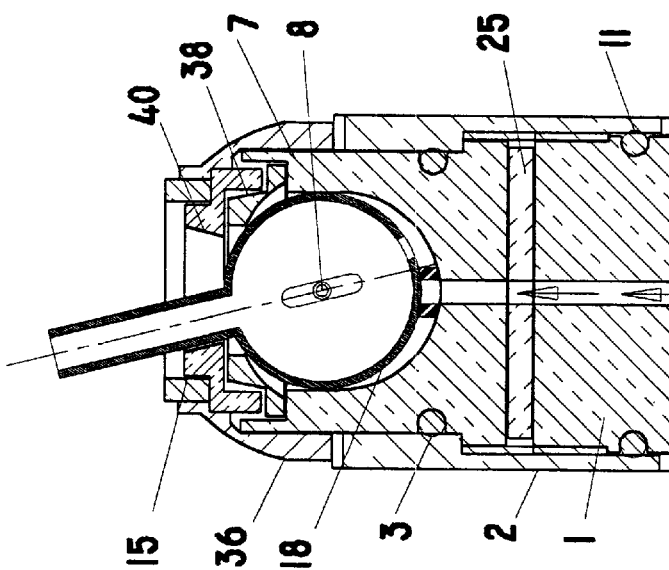

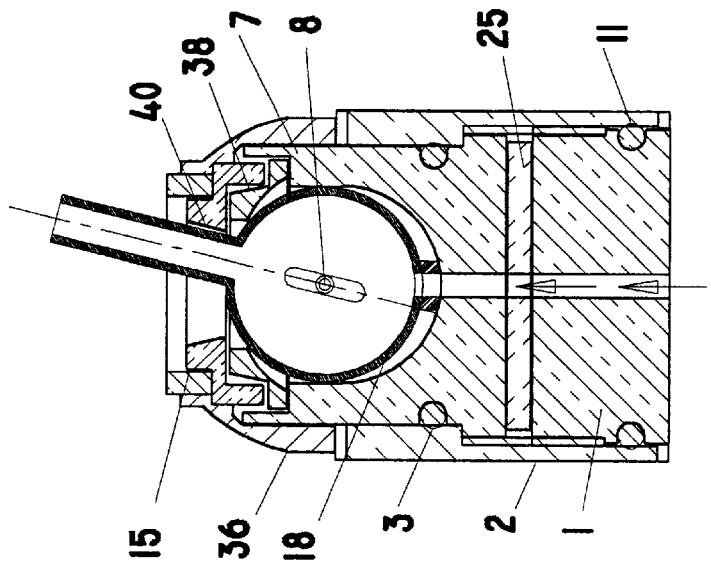
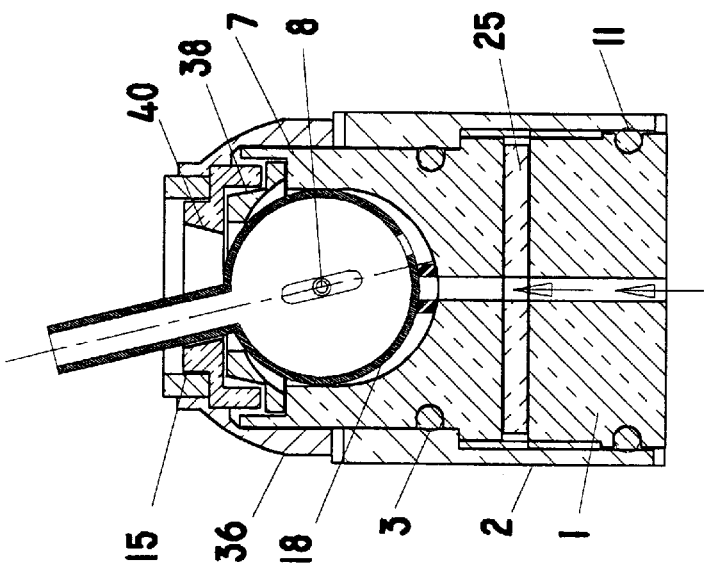

SPOUT CONTROLLED MIXING VALVE MECHANISM

CROSS REFERENCE TO RELATED APPLICATIONS

This application claims the benefit in the form of a continuation-in-part under 37 CFR 1.53(b)(1) of parent applications, Ser. No. 08/926,538 filed Sep. 10, 1997, now U.S. Pat. No. 6,070,612 and Ser. No. 09/086,378 filed May 28, 1998, now abandoned both by the same inventor.

BACKGROUND OF THE INVENTION

The present invention relates to the field of valves, faucets or liquid dispensers. More particularly, it relates to an improved valve or faucet which enables mixing or blending a plurality of separate streams of liquid as well as regulating flow rate of the liquid stream from the device by the simple up, down, and lateral movements of its liquid discharge spout. This device eliminates the need to operate knobs or handles for the regulation of the flow rate or the temperature while also being less expensive to manufacture. In the drawings and in the following description the invention is disclosed as embodied in a hot and cold water mixing faucet. It will be understood, however, that this embodiment is by way of ease of illustration rather than forming a limitation.

Commonly faucets possess knobs or handles to regulate flow and temperature mix of the liquid delivered. One such handle or knob regulates cold water flow and the other regulates hot water flow, proportionally adjusting the two provides the desired temperature mix and flow from the spigot. Perhaps as common, are faucets operated by a single lever. Typically these regulate flow rate by lifting the lever upwards, and regulate temperature mix by turning the lever laterally in one direction or the other. In both types, there is a requirement for some manner of valve or faucet which is separate from the spout.

Two prior art patents bear more similarity to the present invention more so than the aforementioned types of faucets. However, this invention is believed to be a novel and non-obvious step from these patents and thus in condition for patent protection. The first, Sanchez Aguilar U.S. Pat. No. 4,589,445 describes a spout-operated valve wherein vertical rotation of the spout itself about a horizontal axis results in flow control of the valve. The valve contains passageways in the rotating member and the non-rotating member about which the rotating member rotates. Rotation of the rotating member progresses from non-alignment (and therefore no flow) through full alignment (full flow). The rotation of the one part to the other allows partial alignment of the passageways allowing the user to adjust the flow to the desired rate.

The other patent, Siano U.S. Pat. No. 3,468,343 discloses a swinging spout faucet or valve that controls the admix of hot and cold sources. The volume is controlled by pivoting the spout about one end in a vertical plane and the temperature mix is controlled by pivoting the spout about the same end in a horizontal plane. Although in the present invention the action of pivoting the spout at first appears identical to Siano, this invention provides a more reliable, less expensive, and less complicated valve mechanism than the one disclosed by Siano. Siano uses a complicated series of nested cylinders which, when appropriately raised or lowered, cause the desired flow to occur. In order to translate movement of the spout from a vertical plane to a horizontal plane, a linkage is utilized. One end of the linkage slidingly engages a cylindrical groove machined into one of the cylinders. As the spout is pivoted in the vertical plane, the end of the linkage engaged with the groove rides along the groove resulting in raising or lowering the cylinder appropriately. This action is identical to the action found in threaded rod, screws, or other linear-to-rotational translations relying on the use of an inclined plane. A number of problems are likely to occur with such mechanism. One such problem is that the mechanism is likely to bind. Binding would occur because the control mechanism (the spout) contacts the temperature mixing mechanism at only a single point. That point is where the slotted plate engages the groove. Such a single point contact is typically insufficient to eliminate binding. Another problem is that the slotted plate could easily slip from the groove entirely. If this were to happen, a person could unwittingly use the device and have no immediate outward indication that the device was effectively broken. Admittedly, this would not be a serious problem unless the temperature mixing mechanism were to have slipped from the slotted plate during a 100% hot water condition and subsequently a child or elderly person unknowingly used the device, at which time they could be seriously scalded since there would be no indication that the device was broken. However such a device having once slipped, would be more apt to slip on a regular basis simply due to wear in the slotted plate or groove thereby rendering the faucet unusable.

Other problems this invention seeks to overcome which both Sanchez Aguilar and Siano have in common, is that manipulation of the spout through any plurality of positions causes by default a displacement of the liquid stream from some origin. In the case of a sink, the displacement of the water stream is toward a side wall of the sink rather than approximately aligned with the sink drain. Additionally, because each spout above is typically made of a heat conducting material, i.e., metal, and serves as the temperature control, any further manipulations of the spout require the user to contact the now heated spout surface. Furthermore, these devices do not protect the user from heat conducted through the metal spout when the user manipulates the spout to affect flow or temperature.

SUMMARY OF THE INVENTION

As such, what is needed is a valve that regulates both volume and temperature by use of the valve spout. Such a valve would be safe to use, economical to manufacture, and lack the complexity associated with alternative prior art valves performing similar functions. The present invention defines such a valve. It is further believed that this valve provides both a new and non-obvious resolution to the problems associated with prior art valve mechanisms and as such constitutes a patentable improvement over the prior art.

The present device uses a spout to control both the flow and mixing of liquids. Pivoting the spout about its attachment in a vertical direction controls flow, whereas pivoting the spout in a horizontal direction controls mixing of the supply liquids. As mentioned above, the presently described embodiment is extremely suitable for hot and cold water faucets, where one liquid is hot water and the other cold water. A critical aspect of the present invention is a completely new valve configuration that incorporates the advantages of a ball valve and adapts the ball portion to permit the spout itself to regulate flow and liquid admixing. In a preferred embodiment, the ball portion of the new valve configuration utilizes two pins to further ensure accurate control of flow and admixing of liquids. This configuration has been found to eliminate a great deal of the deficiencies discussed above regarding Siano. Because there are fewer moving parts and no linkages, the present invention is less likely to fail than would Siano. Furthermore, should the present device fail, the relative location of the spout in relation to the sink fixture upon which it is mounted would provide an instant visual indication as to what temperature and flow condition in which the valve failed. Should liquid flow be reestablished, the user would know what to expect based upon the spout's position. This is because there are no internal linkages which could fail; thereby, placing the spout in a position not reflecting the characteristic volume and temperature of the liquid flow of that position.

An additional improvement would be to utilize a swiveling spray aerator fixture at the water discharge end of the spout. The swiveling spray aerator is adjustable irrespective of the spout position. This adjustability enables a user to redirect the spray stream toward the center of the sink or toward whatever position the user desires. In fact, the swiveling spray aerator is useful for making fine directional adjustments to the liquid spray stream. Additionally, it serves as a convenient location to grasp and thereby control the flow and temperature. By making the swiveling spray aerator fixture of plastic, some other minimally heat conducting material, an internal tube nested within the spout tubing itself or some other means, the user avoids scalding his or her hand on the spout itself.

It is therefore an object of the invention to provide an improved device that allows for both flow control and admixing of at least two separate streams of liquid by manipulation of the liquid discharge spout.

It is another object of the present invention to provide a location that is essentially thermally non-conductive thereby enabling a user to grasp the spout that may be hot due to the passage of a hot liquid therethrough without risking a burn.

An other object of the present invention is to provide a means to microadjust the direction of the liquid spray stream.

It is still another object of the present invention to provide a cost effective, economically produced device which is both mechanically reliable and eliminates the majority of problems associated with prior art valves of similar purposes.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawings.

FIG. 1A shows a top view of a preferred embodiment of the spout controlled mixing valve mechanism with a swiveling spray aerator fixture, the phantom depiction of the spout further illustrates that the spout can be moved in an arc about its base;

FIG. 1B shows a side view of the FIG. 1A spout, the phantom depiction of the spout illustrates that the spout can be moved up or down;

FIG. 1C shows a front view of the FIG. 1A spout, the phantom depiction of the spout illustrates that the spout can be tilted either to the left or right of center;

FIG. 2 is an exploded assembly view of a preferred embodiment of spout controlled mixing faucet;

FIG. 3 depicts in a section view the preferred ball valve volume and admixing mechanism with two slots for pin alignment enabling the FIG. 2 spout controlled mixing valve mechanism to properly function;

FIG. 8 is a sectional view of another embodiment of the present invention depicting a ball having one inlet port;

FIG. 9 is a top view of a top plate used in the embodiment of FIG. 7;

FIG. 13A depicts a side sectional view of the FIG. 4 embodiment of the present invention having two inlet ports and two liquid supplies, the ball valve being in a position to totally occlude flow of the liquid supplies;

FIG. 13B depicts a side sectional view of the FIG. 4 embodiment of the present invention having two inlet ports and two liquid supplies, the ball valve being in a position to allow full flow of the liquid supplies;

FIG. 15A depicts a side sectional view of the FIG. 8 spout controlled mixing faucet ball valve volume and admixing mechanism having one inlet port and two liquid supplies, the ball valve being in a position totally occluding flow of the liquid supplies;

FIG. 15B depicts a side sectional view the FIG. 8 spout controlled mixing faucet ball valve volume and admixing mechanism having one inlet port and two liquid supplies, the ball valve being in a position allowing full flow of the liquid supplies;

DETAILED DESCRIPTION OF THE PREFERRED EMBODIMENTS

Figure 4:
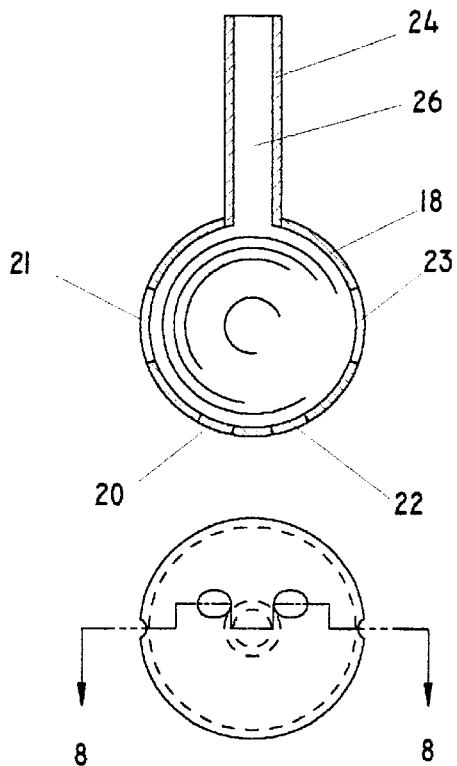
FIG. 4 is a cutaway of a preferred type of ball for the FIG. 3 ball valve with two inlet ports.

With reference to FIGS. 1A, 1B, and 1C, one preferred embodiment of a spout controlled mixing faucet referenced generally as 10 is depicted. The spout controlled mixing faucet 10 is suitably adapted to receive a swiveling spray aerator fixture 12 as depicted, which may or may not be used. The combination of the two however, provides the ability to control the admixing and flow of liquids controlled by the faucet as well as to further direct the discharged liquid to a target area. Another important advantage of the use of such a swiveling spray aerator fixture is that it provides a thermally non-conductive location for a user to grasp while manipulating the faucet.

It being further specifically understood that such a mixing faucet could be used to mix a large number of liquids, each of such liquids potentially possessing vastly different characteristics. Though it has previously been stated that the preferred use of the present invention is as a faucet to mix hot and cold water supplies at a sink such as those customarily found in a kitchen, bathroom, or utility room, a ball valve mechanism is also envisioned which serves only to control the volume of a single liquid.

Looking once again at the FIGS. 1A, 1B, and 1C, the spout controlled mixing faucet 10 includes a spout 14, preferably of the swan neck type as depicted in FIG. 1B, however other types of spouts are easily adapted to the present invention and are considered part of it as well. Spout 14 has a spout discharge end 16, which as stated above is adapted to receive a swiveling spray aerator fixture 12. Though not depicted, the spout 14 could be produced in a nested tube configuration. That is, an outer tube that forms the externally visible portion of the spout 14 could contain nested within, an inner tube which functions to carry the liquid. An air space between the two portions or tubes would effectively insulate the outer tube from the inner tube.

With the exception of the nested tube embodiment, FIG. 2 depicts an exploded view of the components used to produce such a device. However, interaction of the individual components is best understood by looking more specifically at FIGS. 3 and 4, wherein a rotating ball 18 is provided having two liquid inlet ports, depicted as ports 20 and 22 in FIGS. 3 and 4, one for each of two supply liquids; and two slots, depicted as slots 21 and 23 in FIGS. 3 and 4. The slots 21 and 23 are critical in that they allow communication with alignment pins 8, one such pin provided for each slot. Further, each of the liquid inlet ports 20 and 22 is capable of communication with the supply liquid(s). The flow volume and admixing of the liquid supplies may be controlled by aligning, either fully, partially or not at all, the inlet ports 20 and 22 of the faucet with the supply liquids.

Referring to FIG. 3, the two pins 8 are shown rigidly positioned within valve body 7 and extending into the ball valve slots 21 and 23. Although a single pin is common practice in the field of ball valves, an important aspect of the preferred embodiment of the present invention is that it utilizes two pins 8 to accurately position rotating ball 18 within the valve body 7 with respect to the liquid inlet ports. The pins 8 also reduce the likelihood of valve failure due to binding. It has been found that the use of these two pins provides an operator with more efficient leverage to operate the valve mechanism.

Although the use of two pins 8 forms the preferred embodiment, the ability of the invention to function with one pin is recognized. Additionally, the use of a greater number of pins is also a possibility, therefore the invention is considered to incorporate the use of any number of pins. Each pin must engage a single slot and of course not create an impediment to the function of the ball valve itself. However, that being said, the invention is described from hereon as having only two pins.

The pins 8 pivotally couple the ball 18 to the body 7 such that the ball is free to pivot on the pins. The pivotal motion of the ball 18 on pins 8 enables the volume of the flow of water to be controlled by the movement of the spout up or down as shown in FIG. 1B. In a preferred embodiment, when the spout is in a downward position as depicted in FIG. 1B, liquid inlets ports 20 and 22 are in alignment vertically with the water supplies. As the spout is moved upward, or pushed backward from the perspective of the operator, the ball 18 is pivoted about pins 8 such that inlet ports 20 and 22 become increasingly misaligned with the water supplies thus gradually eliminating the passage of liquid as communication with the ports 20 and 22 decreases.

The preferred embodiment comprises inlet ports 20 and 22 of a diameter at least twice the diameter of the water supply openings as depicted in FIG. 3, and spaced apart a minimum distance equal to the diameter of the water supply openings. In the preferred embodiment, the inlet ports are configured as ovals. The oval-shaped inlet ports 20 and 22 allow a full range of admixing, achieved by moving the faucet from side to side (FIG. 1C) for a given flow volume and yet limits the range of motion required to obtain a full range of flow volume which is achieved by moving the faucet up and down (FIG. 1B). Please refer to FIG. 4 wherein the ball valve, as viewed from the bottom, is shown for orientation of the section 8—8 view also included therein.

The interaction of the pins 8 with the slots 21 and 23, the length of the slots 21 and 23, the size of said inlet ports 20 and 22 relative to those of the water supply openings, and the distance separating the ports 20 and 22 allow for the ball 18 to move across a full range of temperature combinations as shown in FIGS. 14A–14E. At one extreme FIG. 14A, the liquid inlet port 22 is in full communication with the cold (C) water supply and liquid port 20 is totally occluded. Therefore, there is a full flow of the C liquid supply and zero flow of the H liquid supply. At an opposing extreme FIG. 14E, the liquid inlet port 22 is in full communication with the hot (H) water supply and liquid inlet port 20 is totally occluded. Therefore, there is a full flow of the H liquid supply and zero flow of the C liquid supply. Between these two extremes, as depicted in FIGS. 14B, 14C and 14D, the liquid inlet ports 20 and 22 are in varying degrees of communication with the hot (H) and cold (C) water supplies respectively.

An alternate embodiment uses a ball with one inlet port 20 as shown in FIGS. 8 and 15. FIG. 15A shows the one inlet port 20 embodiment in a position wherein the inlet port 20 is totally occluded and thus preventing the flow of the two liquid supplies. FIG. 15B shows the one inlet port 20 embodiment in a position wherein the inlet port 20 is in full communication with the two liquid supplies, thus allowing full volume flow of the supplied liquids.

Figure 10:
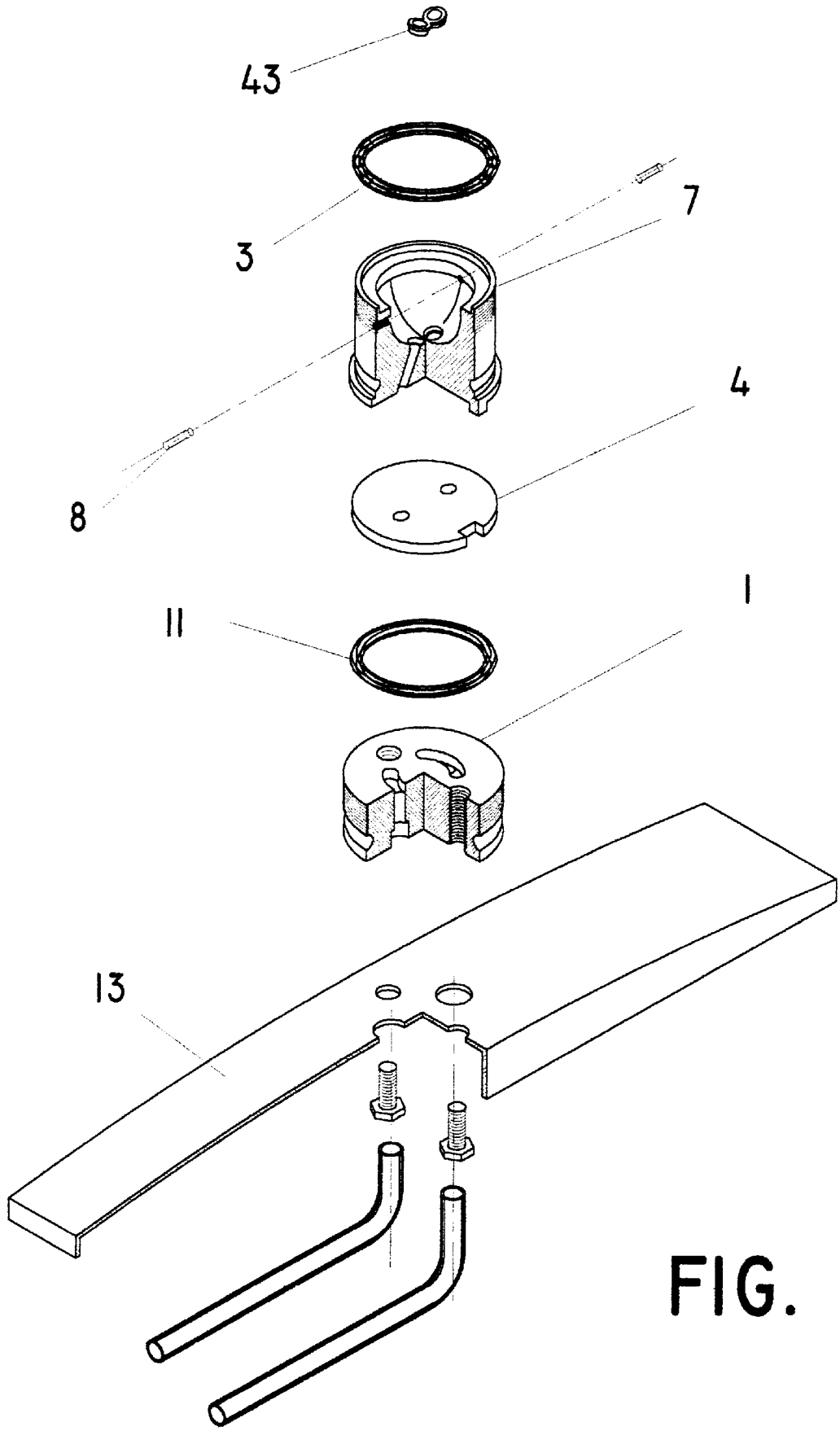
FIG. 10 is an exploded view of an embodiment of the spout controlled valve mechanism showing the base, valve body and washer for the FIG. 8 embodiment.

The preferred embodiment of Applicant's ball valve, as shown in FIG. 4, has slots 21 and 23 arranged in a top to bottom vertical alignment within the ball 18 surface. The length of the slots from top to bottom is longer than the width of said slots; whereas the width of said slots is only slightly larger than the diameter of pins 8 to allow for a slip fit of said pins into said slots. This configuration prevents movement of said ball in an axial motion. Although the preferred embodiment has the slots 21 and 23 in a vertical position, said slots 21 and 23 can be tilted on the surface of rotating ball 18 by up to 45 degrees in a backward direction or up to 45 degrees in a forward direction. For purposes of understanding the limitation of the 45 degree tilt from vertical, "up to 45 degrees" comprises an approximate limit. The limitation is realistically dependent upon that angle after which the pins are more likely to travel up the inclined slope formed by the slots rather than bear upon the side walls of the slots thereby causing the body 7 to turn, the result desired. Therefore, one important aspect of the pins 8 is that they rigidly engage body 7 during movement to the left and to the right for various sink positions as shown in FIG. 1A while still allowing volume adjustment and admixing of liquid within all faucet positions. Configuration of the slots and pins in accordance with this invention ensures that the body 7 swivels with the spout 14 as the spout is rotated about the base. Swivel plate 4 has a notch as shown in FIG. 10 to receive the matching protrusion on the bottom edge of body 7 also shown in FIG. 10 ensuring that swivel plate 4 rotates with body 7 and maintains communication with the liquid supplies when the spout 14 is rotated about the base to control the direction of the flow of the liquids as shown in FIG. 1A.

As in the parent application, this ball valve comprises ball 18 containing a hollow stem 24 depicted in FIGS. 4 and 8. Within the hollow stem 24 is a central passage 26. The internal construction of rotating ball 18 is that the liquid inlet ports 20 and 22 converge within the hollow ball 18 and lead therefrom to the central passage 26. Central passage 26 communicates with a spout inlet end 30. Many ball forms exist in the art, but their commonality is that each combines separate flow paths into a single flow path within the ball. Therefore, any form of ball is considered appropriate so long as it is modified to have a hollow stem 24, at least two slots 21 and 23 for at least two pins 8 and two inlet port(s) 20 and 22 sized and configured as disclosed herein.

Figure 14:
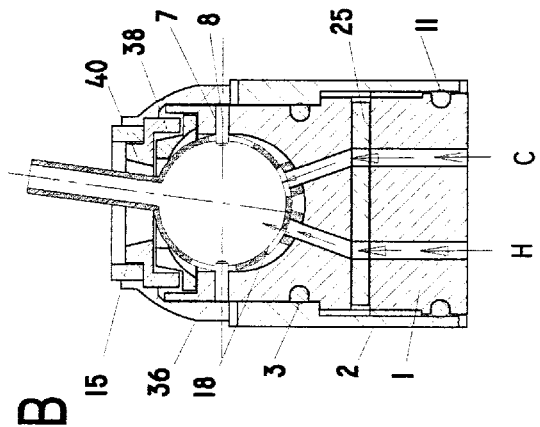
FIG. 14A depicts a front sectional view of the FIG. 3 embodiment ball valve volume and admixing mechanism, the ball valve being in a position allowing full flow of the C liquid supply and zero flow of the H liquid supply.
FIG. 14B depicts a front sectional view of the FIG. 3 embodiment ball valve volume and admixing mechanism, the ball valve being in a position allowing full flow of the C liquid supply and partial flow of the H liquid supply.
FIG. 14C depicts a front sectional view of the FIG. 3 embodiment ball valve volume and admixing mechanism, the ball valve being in a position allowing full flow of the C liquid supply and full flow of the H liquid supply.
FIG. 14D depicts a front sectional view of the FIG. 3 embodiment ball valve volume and admixing mechanism, the ball valve being in a position allowing full flow of the H liquid supply and only partial flow of the C liquid supply.
FIG. 14E depicts a front sectional view of the FIG. 3 embodiment ball valve volume and admixing mechanism, the ball valve being in a position allowing full flow of the H liquid supply and zero flow of the C liquid supply.
Figure 14:
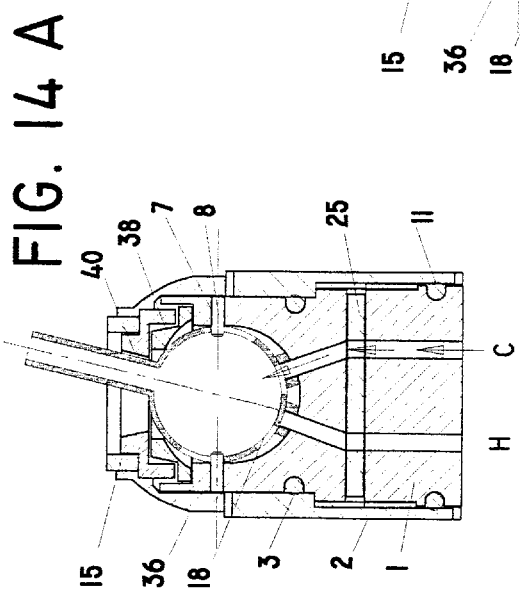
Figure 14:
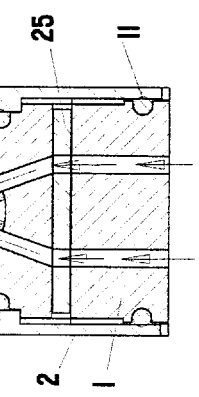
Figure 14:
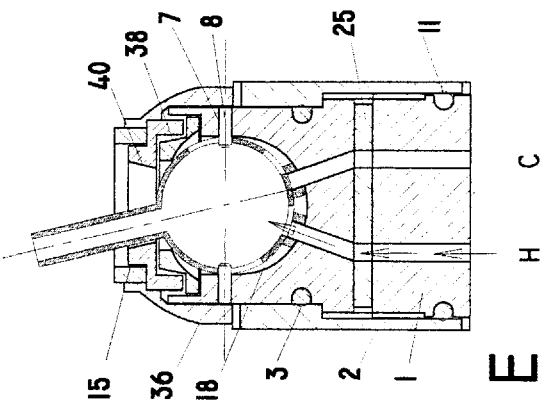
Figure 14:
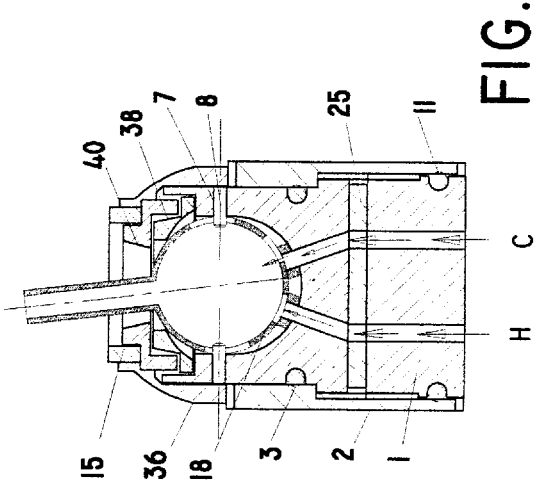
Figure 16:
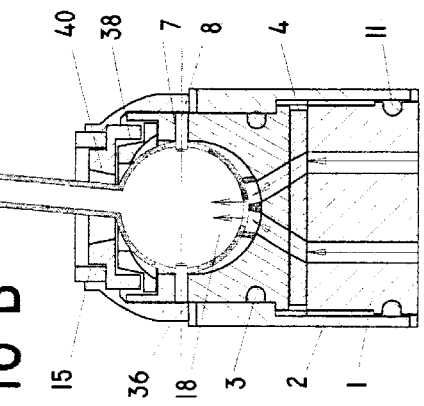
FIG. 16A depicts a front sectional view of the FIG. 3 embodiment ball valve volume and admixing mechanism having one inlet port and two liquid supplies, the ball valve being in a position allowing full flow of the C liquid supply and zero flow of the H liquid supply.
FIG. 16B depicts a front sectional view of the FIG. 3 embodiment ball valve volume and admixing mechanism having one inlet port and two liquid supplies, the ball valve being in a position allowing partial flow of the C liquid supply and partial flow of the H liquid supply, there being a greater flow of the C liquid supply as compared to the H supply fluid.
FIG. 16C depicts a front sectional view of the FIG. 3 embodiment ball valve volume and admixing mechanism having one inlet port and two supply fluids, the ball valve being in a position allowing partial flow of the C supply fluid and partial flow of the H supply fluid, there being approximately equal flow of the C liquid supply and the H liquid supply.
FIG. 16D depicts a front sectional view of the FIG. 3 embodiment ball valve volume and admixing mechanism having one inlet port and two supply fluids, the ball valve being in a position allowing partial flow of the C supply fluid and partial flow of the H liquid supply, there being a greater flow of the H liquid supply as compared to the C liquid supply.
FIG. 16E depicts a front sectional view of the FIG. 3 embodiment ball valve volume and admixing mechanism having one inlet port and two liquid supplies, the ball valve being in a position allowing full flow of the H liquid supply and zero flow of the C liquid supply.
Figure 16:
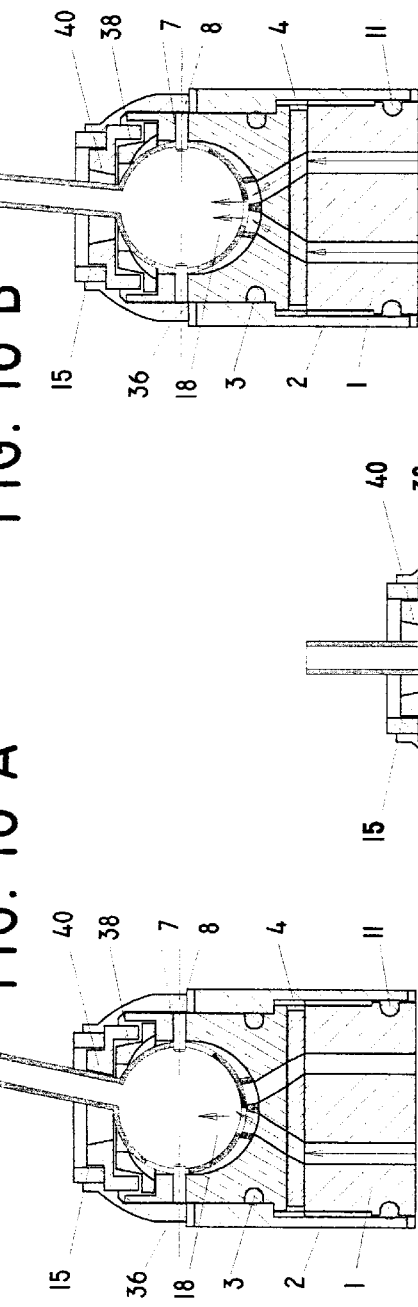
Figure 16:
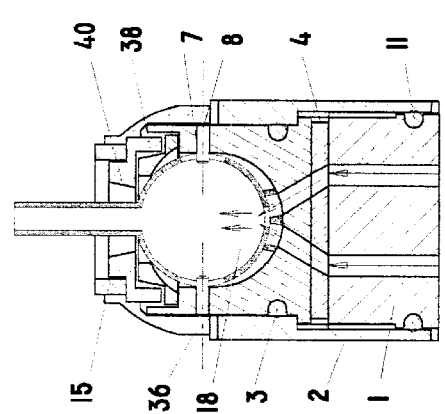
Figure 16:
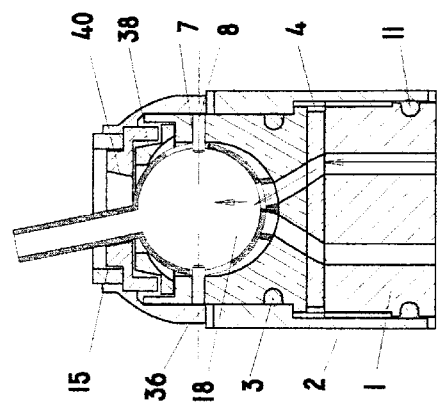
Figure 16:
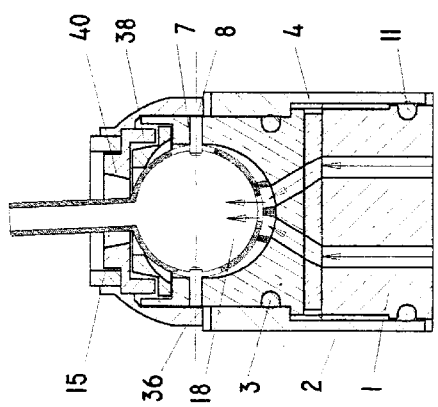

As depicted in FIG. 14, the rotating ball 18 is free to rotate within its seat limited by its contact with other portions of the device as referred to below. The ball 18 must be able to permit alignment of the liquid inlet ports 20 and 22 with their respective hot (H) and cold (C) water supplies in a zero flow condition, a partial flow condition and a full one hundred percent (100%) flow condition. Of course there exists a multiplicity of flow volume and temperature conditions within the extreme boundaries that the apparatus is capable of obtaining. This is accomplished as depicted in FIGS. 14A–14E by using a ball 18 with two inlet ports 20 and 22 each having a diameter at least twice the diameter of the supply openings and spaced apart horizontally at least the distance equal to the diameter of the supply openings.

The embodiment of the present invention having one inlet port 20 is likewise capable of allowing a full range of admixing combinations as depicted in FIGS. 16A–16E wherein there are two supply liquids, a cold (C) supply and a hot (H) supply. As shown, the one inlet port 20 can allow full flow of the C supply only, FIG. 16A; full flow of the H supply only, FIG. 16E; an equal flow of the C supply and the H supply, FIG. 16C; or an unequal proportionate mix of the C and H supply liquids. As shown in FIGS. 16A–16E, the liquid supplies are transitioned to a relatively close side by side configuration so that the range of movement of the ball within the faucet required to achieve the full range of effective admixing combinations by moving the spout from side to side as shown in FIG. 1C is minimized. This is desirable so that the spout can be kept relatively centered above the sink in a typical installation setting.

In order to facilitate and improve the operation of the faucet, washers are included to improve the seal between the interfacing surfaces of the ball valve and the valve body 7 and also to ease the movement of the ball valve relative to the valve body 7. FIG. 3 shows washers 42 and 44 with their apertures each disposed about the supply liquid openings in the seat of the valve body 7. The washers may be typically constructed of a rubber material to ease and facilitate movement of the ball valve 18. The washers 42 and 44 are shown as having a lip that extends downward into the supply liquid openings in the seat of the valve body 7. The washers 42 and 44 may also be observed in FIG. 6

Figure 17:
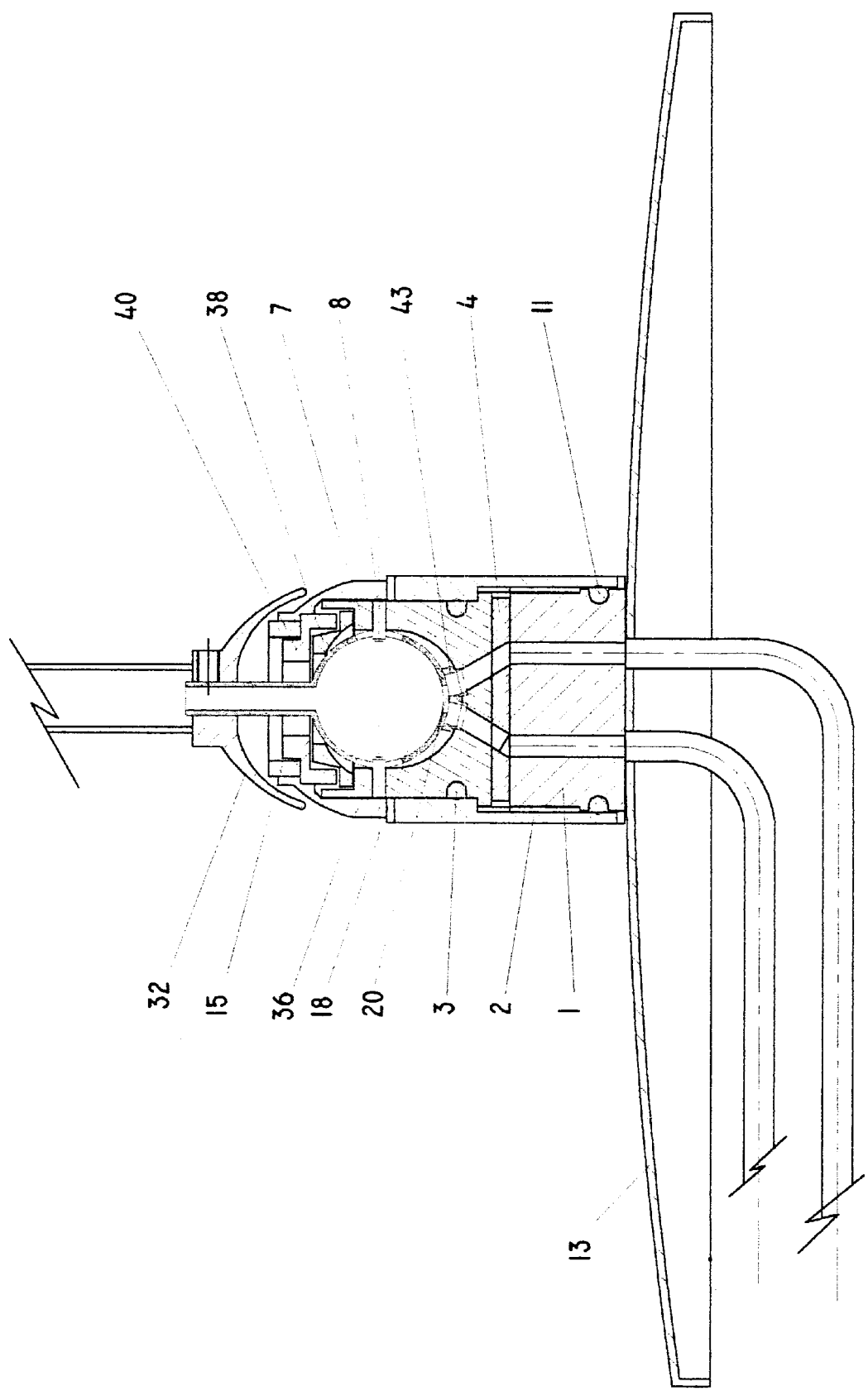
FIG. 17 depicts a front sectional view of the FIG. 3 embodiment ball valve volume and admixing mechanism having one inlet port and two liquid supplies.

The one inlet port embodiment also may have a washer to improve and facilitate the operation of the faucet by improving the sealing and ease of movement aspects of the faucet as shown in FIGS. 7, 15A–15B 16A–16E and 17. In FIGS. 15, 16 and 17 there are two liquid supplies. Thus, there are two washers 43 arranged in close side-by-side configuration. The close side-by-side configuration of washers 43 can be better seen in FIG. 10. The washers 43 may also be attached or molded in one piece to form a figure "8" configuration. Here too, the apertures of the washer(s) 43 will coincide with the supply liquid openings in the seat of the valve body 7.

Figure 12:
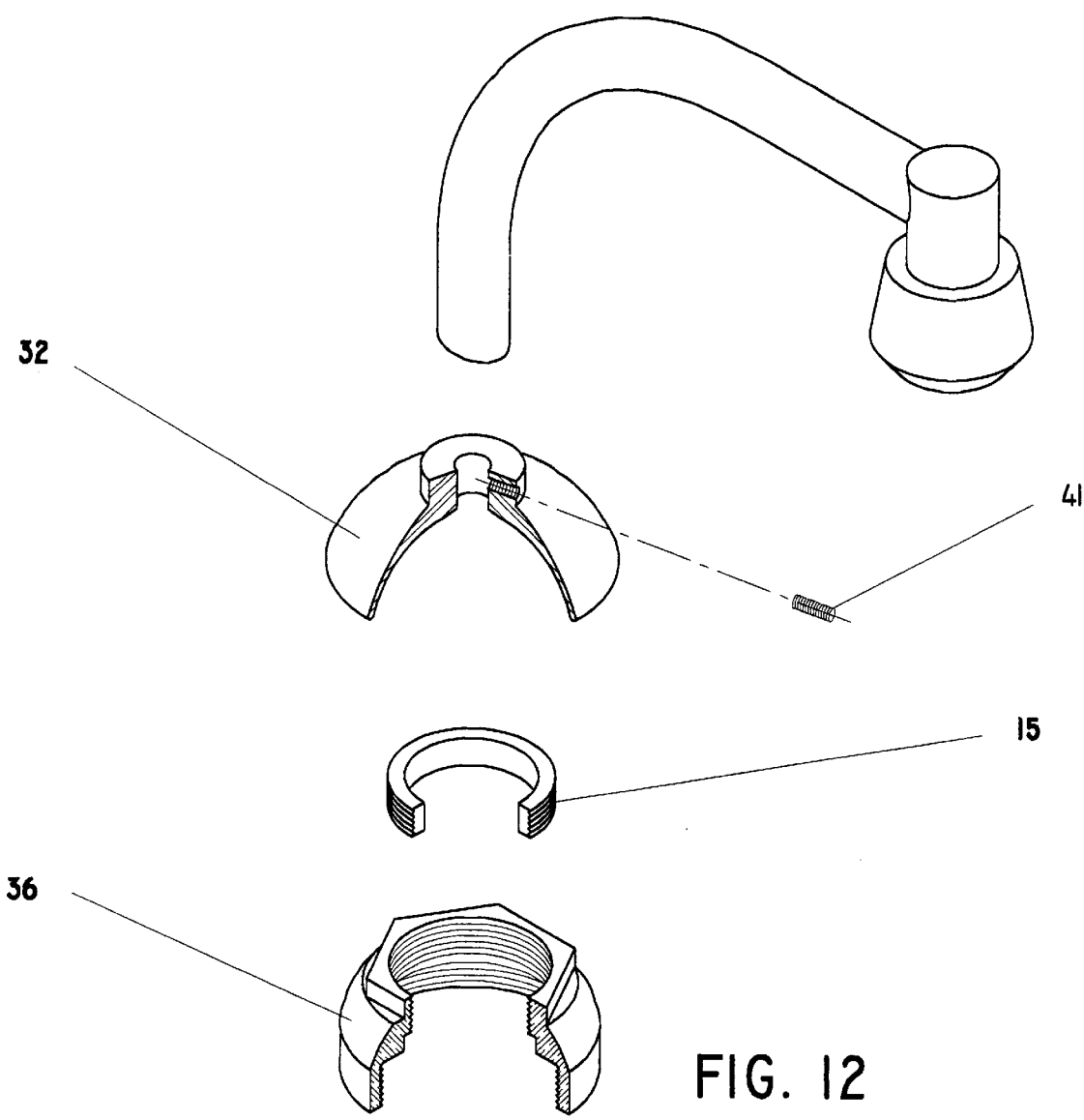
FIG. 12 is an exploded view of the preferred embodiment of a faucet spout with cutaway view of faucet skirt and valve cap.

Attached to an exterior portion of the hollow stem 24 is a skirt 32 as shown in FIG. 12. The skirt 32 serves to cover and therefore protect a chamber 34, shown in FIG. 3, from potential impact by foreign material. The chamber 34 provides a space within which the hollow stem 24 is allowed to move about.

Figure 11:
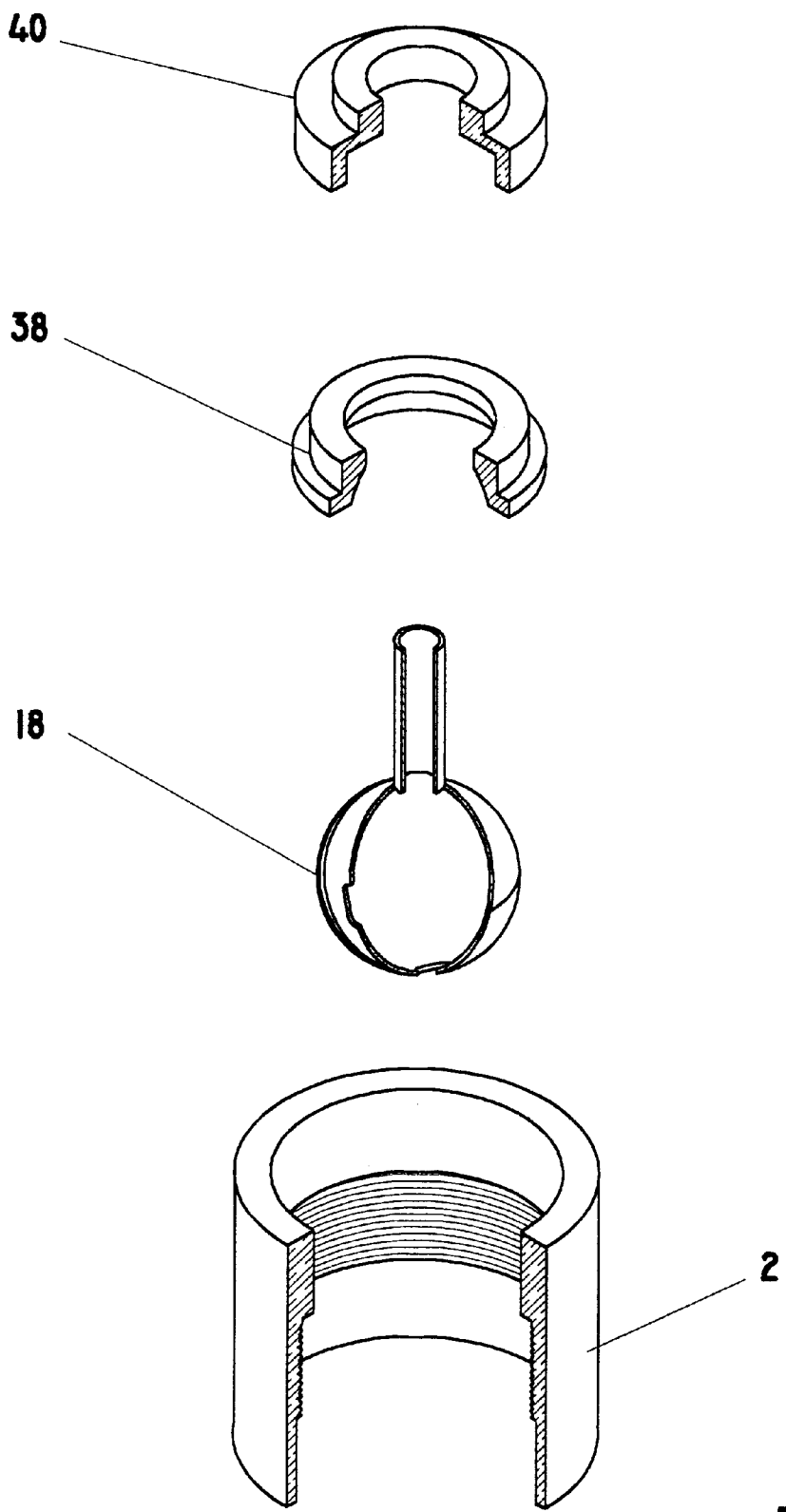
FIG. 11 is an exploded sectional view of one embodiment of the valve body cover and ball assembly.

In the preferred embodiment, the rotating ball 18 is held within the device by a valve cap 36. Interposed between the rotating ball 18 and the valve cap 36 is a spacer 15, a gland 38, and a gland retainer ring 40. Positioning of the gland 38 and gland retainer ring 40 is shown in FIG. 11 using the FIG. 8 ball. Gland 38 places a continuous pressure on the ball 18 to ensure adequate seal between the liquid inlet ports and the water supplies and prevent liquid leakage from the spout mechanism by way of slots 21 and 23. As described above, washers may also be included to further ensure against leakage. The gland 38 further serves to reduce the coefficient of friction which would otherwise be greater were the valve cap 36 and the rotating ball 18 to come into direct contact. The material selected and the type of construction for the gland 38 is common in the field of valve design. To maintain a constant downward directed pressure on ball 18, gland retainer ring 40 is provided which can be intermittently tightened as needed using valve cap 36. Valve cap 36, spacer 15, gland 38, and gland retainer ring 40 must be structured to enable adequate rotation of ball 18, therefore sufficient space should be provided for hollow stem 24 to rotate within specified part parameters. Other means could be employed to ensure that the ball remains in proper contact with its liquid supplies which do not incorporate all of the above items, the valve cap 36, spacer 15, gland 38, and gland retainer ring 40; however, the ball 18 must be held into the device and the hollow stem 24 must be able to rotate within chamber 34.

Figure 5:
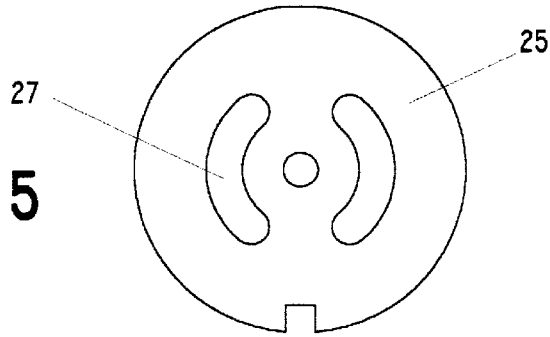
FIG. 5 is a top elevation view of a swivel plate used in a preferred embodiment.

Furthermore, in the preferred embodiment, body 7 rotates on a swivel plate 25. FIG. 5 shows such a swivel plate 25 which helps to further extend the liquid spray coverage of the device by enabling the valve mechanism to swivel about its mount. This swivel plate 25 has two arcuate slots 27 which align with the hot and cold water supplies at a portion just below the valve mechanism. By configuring the slots as arcs, it can be seen that the valve mechanism can be swiveled, i.e. rotated, through an arc range of movement without shutting off the water supply. The configuration of the slots 27 ensures that no changes occur to volume or temperature when the valve mechanism is swiveled upon the swivel plate 25.

Although a number of materials exist which would allow the device to operate properly two materials have been contemplated which allow swivel plate 25 to perform the function desired. These materials are TEFLON and a ceramic or ceramic composite. Both of these materials exhibit properties of low coefficients of friction and long wear. These materials have the necessary qualities that swivel plate 25 requires to minimize friction and ensure long wear.

Figure 6:
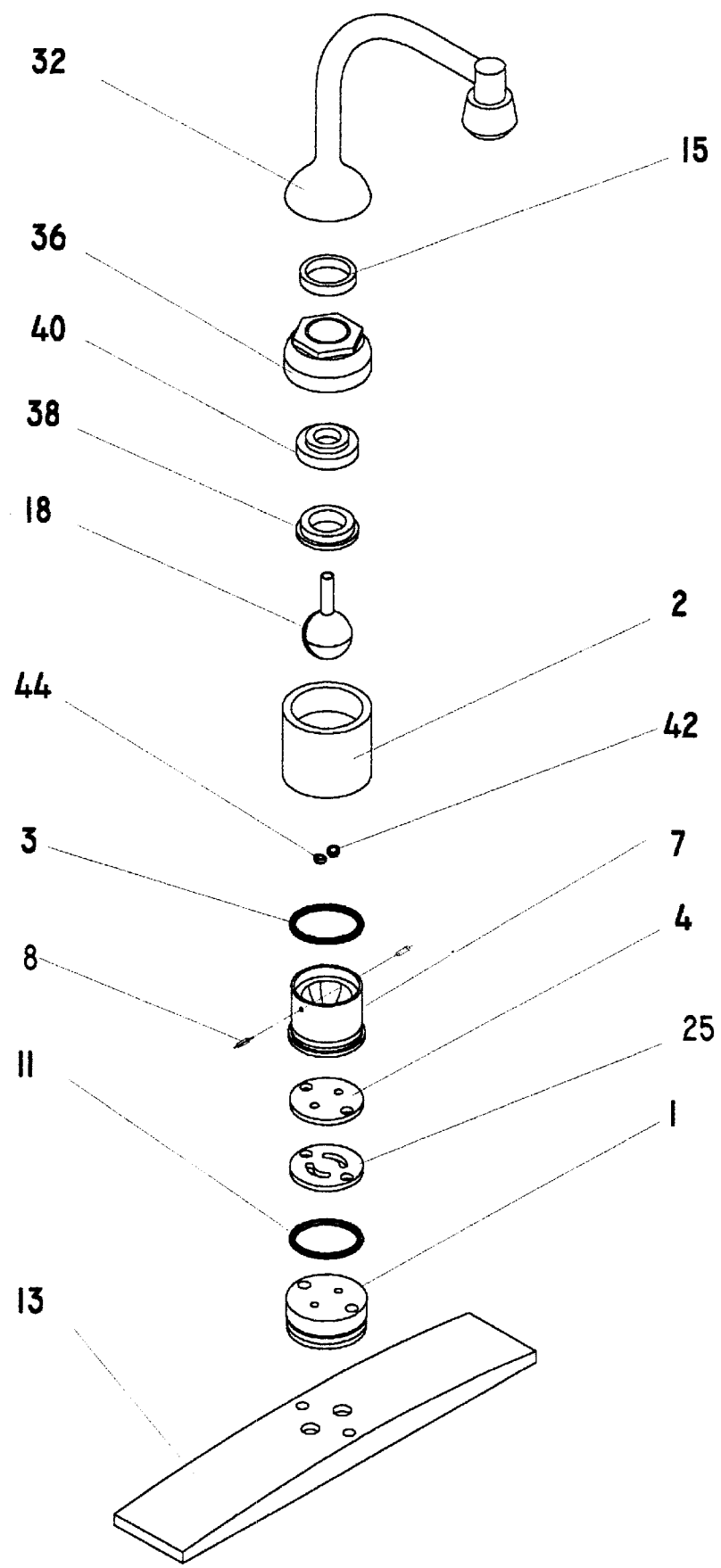
FIG. 6 is an exploded assembly view of another embodiment of spout controlled mixing faucet using a top plate and a swivel plate.

An alternate embodiment of the valve mechanism is shown in FIG. 6. This embodiment uses a ceramic swivel plate 25 in conjunction with a ceramic top plate 4 to further take advantages of the said low coefficient of friction of ceramic, by mating the working surface of swivel plate 25 against the ceramic surface of top plate 4 to minimize the frictional force therebetween during the swivel motion of said faucet. In either embodiment, a base 1 attaches the faucet assembly to the faucet mounting plate 13. The body 7, the swivel plate 25, and the base I are enclosed within body cover 2 and sealed with o-rings 3 and 11.

Figure 7:
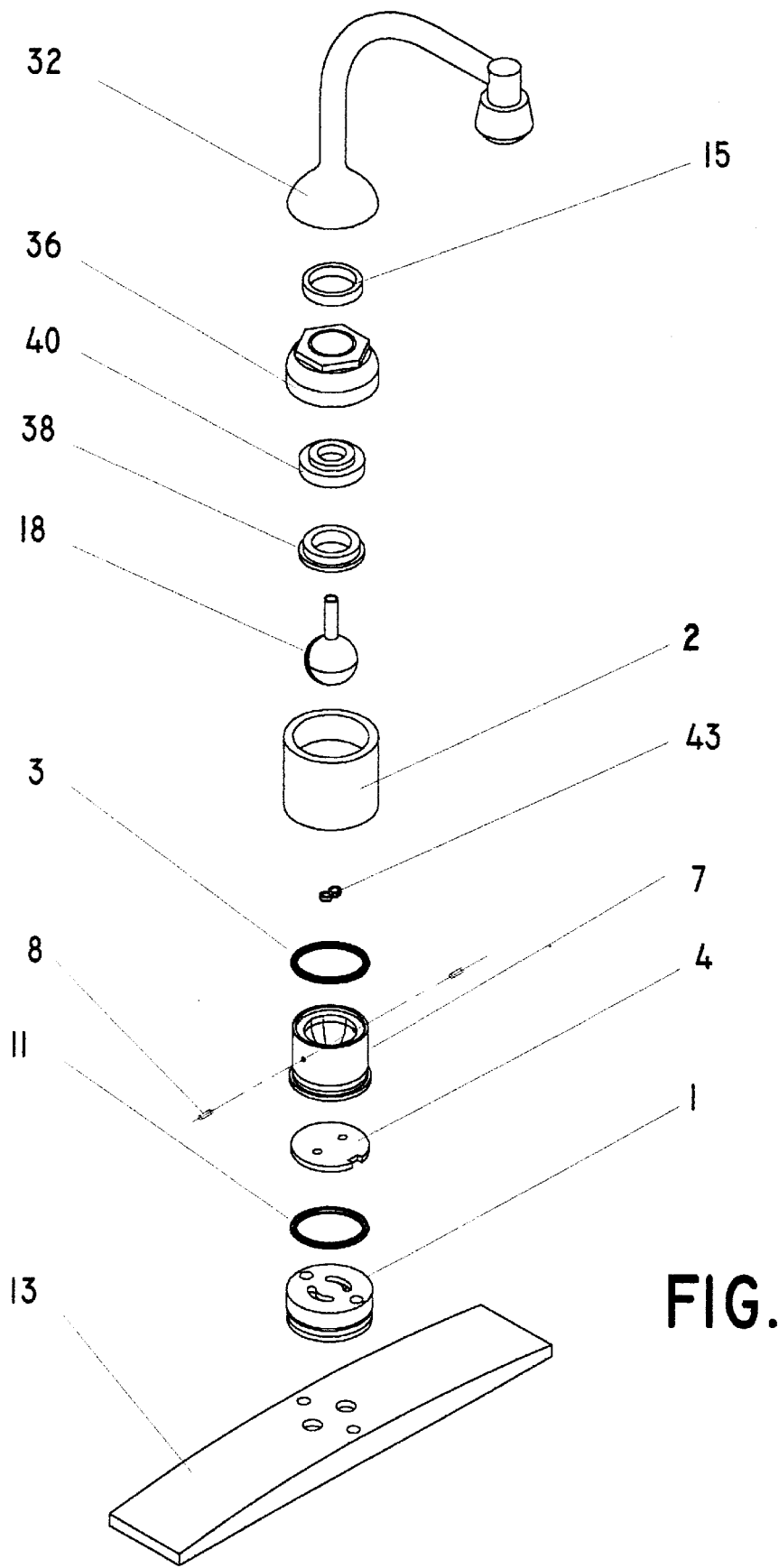
FIG. 7 is an exploded assembly view of another embodiment of the spout controlled mixing valve mechanism having the arcuate slots for the swivel function in the base.

Another embodiment of the valve mechanism is shown in FIGS. 7 and 10. This embodiment places the arcuate slots for accommodating the faucet swivel motion in the base rather than the swivel plate of the FIG. 6 embodiment. The method of operating the faucet remains the same as described above.

Use of the apparatus is similar to that found in single handle faucets containing ball valves. The major exception being that the rotating ball 18 has attached valve stem 24, at least two pins 8 communicating with slots 21 and 23 of said rotating ball 18, and swivel plate 25. As such, the above-described embodiments allow the user to manipulate spout 14 multi-directionally; in a forward and backward direction from said user's perspective to regulate flow rate or volume of water. To regulate admixing of liquid, or specifically temperature of water in a sink faucet, the user would tilt the spout 14 in a side-to-side manner. Of course as is typical of most ball valves, the range of motion can move in a plurality of combinations of forward-to-backward and side-to-side motions. A previous problem noted with the use of this type of apparatus was that the direction of liquid discharge stream from the spout discharge end 16 was determined by the relative placement of the spout discharge end 16 within the sink. This placement was dependent on the resultant position of spout 14 at the desired flow rate and temperature. The Applicant overcame this problem by the addition of the pins 8 and their corresponding slots in rotating ball 18 along with swivel plate 25 made of TEFLON or a ceramic. Allowing the entire valve mechanism to rotate about base 1 upon swivel plate 25 gives spout 14 full range of positioning within the sink without altering temperature or volume. In addition to the valve's ability for rotational movement, a swiveling spray aerator fixture 12 attached to spout 14 enables the user to further direct the water spray within the sink boundary. This swiveling spray aerator fixture 12 not only enables the operator to further adjust or micro-adjust the direction of the spray but also provides a convenient location for the user to grasp the spout without fear of thermally conducting the heat from the metal spout to the user's hand because said swiveling spray aerator fixture 12 should be made of a material having properties of low thermal conductivity as discussed supra.

As such the method of making and using the device detailed above constitute the inventor's preferred embodiment and alternate embodiments to the invention. The inventor is aware that numerous configurations of the device as a whole or some of its constituent parts are available which would provide the desired results. While the invention has been described and illustrated with reference to specific embodiments, it is understood that these other embodiments may be resorted to without departing from the invention. Therefore the form of the invention set out above should be considered illustrative and not as limiting the scope of the following claims.

What is claimed is:

1. A spout controlled mixing valve mechanism for controlling the admixture, volume flow and directional discharge of one or more liquid supplies comprising:

a spout having a discharge end and an inlet end;

a valve body having an interior, two alignment pins, said alignment pins being oppositely and inwardly disposed one toward the other within the interior of said valve body and supply liquid openings for the passage of the at least one liquid supply; and a ball comprising an outer surface having at least two slots into which said alignment pins extend into providing for both pivotal and rotational coupling of said ball with respect to said valve body, said ball further comprising an outlet port, at least one inlet port, at least one internal passage connecting said outlet port to said at least one inlet port, and a tubular extension perpendicular to an outer surface of said ball, said tubular extension comprising a conduit between said outlet port and said inlet end of said spout, wherein said at least one inlet port is flush with the outer surface of said ball for engaging and disengaging with the one or more liquid supplies;

wherein manipulation of said spout is transferred to said ball via said spout's connection to said tubular extension causing said at least one inlet port to pivotally and rotationally interact with the one or more liquid supplies for controlling the admixing, volume flow and directional discharge of the liquid from the outlet end of the spout.

2. The spout controlled mixing valve mechanism of claim 1 wherein said ball is hollow and said internal passage encompasses the entire interior portion of said ball.

3. The spout controlled mixing valve mechanism of claim 1 wherein said slots are each aligned vertically and longitudinally with said tubular extension.

4. The spout controlled mixing valve mechanism according to claim 1 wherein said ball has two s lots for accommodating alignment pins.

5. The spout controlled mixing valve mechanism of claim 1 further comprising a swiveling spray aerator fixture at the outlet of said spout for both redirecting flow and for providing an insulated location for a user to grasp the outlet of said spout.

6. The spout controlled mixing valve mechanism of claim 1 further comprising a swivel plate mounted between a bottommost portion of said valve body and the one or more liquid supplies, said swivel plate further comprising two arcuate slots extending therethrough which allow unimpeded passage of said hot and cold water from said supplies to said inlets and wherein swiveling of said valve body about said swivel plate allows the spout to rotate without impact to the passage of water therethrough.

7. The spout controlled mixing valve mechanism of 6 wherein said swivel plate is constructed of TEFLON.

8. The spout controlled mixing valve mechanism of 6 wherein said swivel plate is constructed of a ceramic composite.

9. The spout controlled mixing valve mechanism of claim 1 wherein said spout is movable in multiple directions and each position of said spout correlates to a specific volume and admixture of liquid from the outlet of the spout.

10. The spout controlled mixing valve mechanism of claim 1 wherein said ball comprises at least one oval-shaped inlet port.

11. The spout controlled mixing valve mechanism of claim 1 wherein said ball has one inlet port.

12. The spout controlled mixing valve mechanism of claim 11 wherein there is one liquid supply and one liquid supply opening in said valve body.

13. The spout controlled mixing valve mechanism of claim 12 further comprising one washer disposed between said valve body and said ball having its aperture aligned with the one liquid supply opening in said valve body.

14. The spout controlled mixing valve mechanism of claim 11 wherein there are two liquid supplies and two liquid supply openings in said valve body.

15. The spout controlled mixing valve mechanism of claim 14 further comprising two washers disposed between said valve body and said ball each having its aperture aligned with one of the two liquid supply openings in said valve body.

16. The spout controlled mixing valve mechanism of claim 15 wherein said two washers are arranged in an attached side-by-side, figure "8" configuration.

17. The spout controlled mixing valve mechanism of claim 1 wherein said ball has two inlet ports.

18. The spout controlled mixing valve mechanism of claim 17 wherein there are two liquid supplies and two liquid supply openings in said valve body.

19. The spout controlled mixing valve mechanism of claim 18 further comprising two washers disposed between said valve body and said ball each having its aperture aligned with one of the two liquid supply openings in said valve body.

20. A spout controlled mixing valve mechanism for controlling the admixture, volume flow and directional discharge of one or more liquid supplies comprising:

a spout having a discharge end and an inlet end;

a valve body having an interior, one or more alignment pins, said one or more alignment pins being disposed within the interior of said valve body and supply liquid openings for the passage of the at least one liquid supply; and a ball comprising an outer surface having at least two slots into which said one or more alignment pins extend into providing for both pivotal and rotational coupling of said ball with respect to said valve body, said ball further comprising an outlet port, at least one inlet port, at least one internal passage connecting said outlet port to said at least one inlet port, and a tubular extension perpendicular to an outer surface of said ball, said tubular extension comprising a conduit between said outlet port and said inlet end of said spout, wherein said at least one inlet port is flush with the outer surface of said ball for engaging and disengaging with the one or more liquid supplies;

wherein manipulation of said spout is transferred to said ball via said spout's connection to said tubular extension causing said at least one inlet port to pivotally and rotationally interact with the one or more liquid supplies for controlling the admixing, volume flow and directional discharge of the liquid from the outlet end of the spout.

21. A spout controlled mixing valve mechanism for controlling the admixture, volume flow and directional discharge of two liquid supplies comprising:

a spout having a discharge end and an inlet end;

a valve body having an interior, two alignment pins, said alignment pins being oppositely and inwardly disposed one toward the other within the interior of said valve body and two supply liquid openings for the passage of two liquids from said two liquid supplies; and a ball comprising an outer surface having two slots into which said alignment pins extend into providing for both pivotal and rotational coupling of said ball with respect to said valve body, said ball further comprising an outlet port, two inlet ports, at least one internal passage connecting said outlet port to said at least two inlet ports, and a tubular extension perpendicular to an outer surface of said ball, said tubular extension comprising a conduit between said outlet port and said inlet end of said spout, wherein said two inlet ports are flush with the outer surface of said ball for engaging and disengaging with the one or more of said two liquid supplies;

wherein manipulation of said spout is transferred to said ball via said spout's connection to said tubular extension causing said at two inlet ports to pivotally and rotationally interact with the one or more of said two liquid supplies for controlling the admixing, volume flow and directional discharge of the liquid from the outlet end of the spout, wherein said ball is hollow and said internal passage encompasses the entire interior portion of said ball;

wherein said slots are each aligned vertically and longitudinally with said tubular extension;

a swiveling spray aerator fixture at the outlet of said spout for both redirecting flow and for providing an insulated location for a user to grasp the outlet of spout;

a base having two arcuate slots extending therethrough;

a swivel plate positioned between the bottommost surface of said valve body and said base wherein said swivel plate is notched accommodating a matching protrusion on said bottommost surface of said valve body whereby swiveling of said valve body rotates said swivel plate on said base;

wherein said arcuate slots in said base allow unimpeded passage of said hot and cold water from said two liquid supplies to said two inlet ports and wherein swiveling of said valve body about said base allows the spout to rotate for said directional discharge of the liquid without impact to the passage of said liquid therethrough;

wherein said spout is movable in multiple directions and each position of said spout correlates to a specific volume and admixture of liquid from the outlet of the spout;

wherein said two inlet ports in said ball are oval-shaped.

* * * * *